United States Patent
Liensberger

(10) Patent No.: US 10,535,342 B2
(45) Date of Patent: Jan. 14, 2020

(54) AUTOMATIC LEARNING OF LANGUAGE MODELS

(71) Applicant: Microsoft Technology Licensing, LLC, Redmond, WA (US)

(72) Inventor: Christian Liensberger, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/483,977

(22) Filed: Apr. 10, 2017

(65) Prior Publication Data

US 2018/0293977 A1 Oct. 11, 2018

(51) Int. Cl.
| | |
|---|---|
| *G10L 15/18* | (2013.01) |
| *G10L 15/22* | (2006.01) |
| *G06F 17/27* | (2006.01) |
| *G10L 15/183* | (2013.01) |
| *G10L 15/193* | (2013.01) |

(52) U.S. Cl.
CPC .......... *G10L 15/22* (2013.01); *G06F 17/2775* (2013.01); *G10L 15/183* (2013.01); *G10L 15/193* (2013.01); *G10L 2015/228* (2013.01)

(58) Field of Classification Search
CPC ............... G06F 17/289; G06F 17/2785; G06F 17/30864; G06F 17/3071; G06F 7/24; G06F 9/446; G06Q 30/02; G10L 15/22; G10L 15/08; G10L 15/265; G10L 15/063; G10L 17/005
See application file for complete search history.

(56) References Cited

U.S. PATENT DOCUMENTS

| | | | | | |
|---|---|---|---|---|---|
| 5,953,701 | A | * | 9/1999 | Neti | ...... G10L 15/142 704/240 |
| 6,308,151 | B1 | * | 10/2001 | Smith | ...... G10L 15/26 704/235 |
| 6,484,136 | B1 | * | 11/2002 | Kanevsky | ...... G06F 17/2765 704/255 |
| 6,901,364 | B2 | * | 5/2005 | Nguyen | ...... G10L 15/1815 704/1 |

(Continued)

OTHER PUBLICATIONS

Gilbert, et al., "Your Mobile Virtual Assistant Just Got Smarter!", In Proceedings of 12th Annual Conference of the International Speech Communication Association, Aug. 27, 2011, 4 pages.

*Primary Examiner* — Jialong He

(57) ABSTRACT

Techniques and systems are disclosed for context-dependent speech recognition. The techniques and systems described enable accurate recognition of speech by accessing sub-libraries associated with the context of the speech to be recognized. These techniques translate audible input into audio data at a smart device and determine context for the speech, such as location-based, temporal-based, recipient-based, and application based context. The smart device then accesses a context-dependent library to compare the audio data with phrase-associated translation data in one or more sub-libraries of the context-dependent library to determine a match. In this way, the techniques allow access to a large quantity of phrases while reducing incorrect matching of the audio data to translation data caused by organizing the phrases into context-dependent sub-libraries.

20 Claims, 9 Drawing Sheets

(56) References Cited

U.S. PATENT DOCUMENTS

| | | | | |
|---|---|---|---|---|
| 7,072,838 B1* | 7/2006 | Ghosh | G10L 15/19 | 704/257 |
| 8,352,246 B1* | 1/2013 | Lloyd | G10L 15/183 | 704/9 |
| 8,694,522 B1* | 4/2014 | Pance | G06F 16/9535 | 707/758 |
| 8,788,256 B2* | 7/2014 | Chen | G10L 15/187 | 434/156 |
| 8,798,983 B2* | 8/2014 | Ohtsuki | G06F 17/2223 | 704/1 |
| 8,938,391 B2* | 1/2015 | Zweig | G10L 15/197 | 704/251 |
| 9,076,445 B1* | 7/2015 | Lloyd | G10L 15/183 | |
| 9,082,402 B2* | 7/2015 | Yadgar | H04M 3/4936 | |
| 9,355,638 B2* | 5/2016 | Melamed | G10L 15/19 | |
| 9,484,025 B2* | 11/2016 | Toopran | G10L 15/193 | |
| 9,489,119 B1* | 11/2016 | Smith, Jr. | G06F 3/0486 | |
| 9,502,032 B2* | 11/2016 | Aleksic | G10L 15/22 | |
| 9,672,818 B2* | 6/2017 | Bradford | G10L 15/18 | |
| 9,679,558 B2* | 6/2017 | Akbacak | G10L 15/063 | |
| 9,740,678 B2* | 8/2017 | Hofer | G06F 17/274 | |
| 9,741,344 B2* | 8/2017 | Bakish | G10L 15/30 | |
| 9,792,534 B2* | 10/2017 | Wang | G06K 9/6269 | |
| 9,805,020 B2* | 10/2017 | Gorman | G06F 17/2705 | |
| 2004/0128140 A1* | 7/2004 | Deisher | G10L 15/20 | 704/275 |
| 2004/0205661 A1* | 10/2004 | Gallemore | G06F 17/273 | 715/259 |
| 2004/0254791 A1* | 12/2004 | Coifman | G10L 15/26 | 704/246 |
| 2005/0038644 A1* | 2/2005 | Napper | G06F 17/242 | 704/9 |
| 2005/0137868 A1* | 6/2005 | Epstein | G10L 15/183 | 704/252 |
| 2005/0192061 A1* | 9/2005 | May | H04M 1/6066 | 455/563 |
| 2005/0246365 A1* | 11/2005 | Lowles | G06F 1/1626 | |
| 2006/0159507 A1* | 7/2006 | Jawerth | G06F 1/162 | 400/472 |
| 2007/0038449 A1* | 2/2007 | Coifman | G10L 15/065 | 704/243 |
| 2007/0124147 A1* | 5/2007 | Gopinath | G10L 15/19 | 704/257 |
| 2007/0127688 A1* | 6/2007 | Doulton | G10L 15/265 | 379/265.01 |
| 2007/0150278 A1* | 6/2007 | Bates | G10L 15/197 | 704/257 |
| 2007/0156403 A1* | 7/2007 | Coifman | G10L 15/08 | 704/252 |
| 2007/0233487 A1* | 10/2007 | Cohen | G10L 15/065 | 704/255 |
| 2008/0091643 A1* | 4/2008 | Malik | G06F 17/30749 | |
| 2008/0222105 A1* | 9/2008 | Matheny | G06F 17/30867 | |
| 2008/0312935 A1* | 12/2008 | Mau, II | G11B 27/105 | 704/275 |
| 2009/0094189 A1* | 4/2009 | Stephens | G06F 17/30616 | |
| 2011/0153620 A1* | 6/2011 | Coifman | G10L 15/065 | 707/748 |
| 2011/0161077 A1* | 6/2011 | Bielby | G10L 15/32 | 704/231 |
| 2011/0307241 A1* | 12/2011 | Waibel | G10L 15/265 | 704/2 |
| 2012/0150533 A1* | 6/2012 | O'Neill | G06F 17/2735 | 704/9 |
| 2012/0245934 A1* | 9/2012 | Talwar | G10L 15/22 | 704/235 |
| 2012/0316877 A1* | 12/2012 | Zweig | G10L 15/197 | 704/251 |
| 2013/0097185 A1* | 4/2013 | Pearson | G06F 17/3064 | 707/749 |
| 2013/0138424 A1* | 5/2013 | Koenig | G06F 17/271 | 704/9 |
| 2013/0346077 A1* | 12/2013 | Mengibar | G10L 15/265 | 704/235 |
| 2014/0019128 A1* | 1/2014 | Riskin | G06Q 10/06 | 704/235 |
| 2014/0074843 A1* | 3/2014 | White | G06Q 10/107 | 707/737 |
| 2014/0201629 A1* | 7/2014 | Heck | G06N 5/00 | 715/708 |
| 2014/0316784 A1* | 10/2014 | Bradford | G10L 15/18 | 704/245 |
| 2014/0379386 A1* | 12/2014 | Drennan | G06Q 40/08 | 705/4 |
| 2015/0106096 A1* | 4/2015 | Toopran | G10L 15/193 | 704/244 |
| 2015/0161521 A1* | 6/2015 | Shah | G06F 3/0481 | 706/12 |
| 2015/0186504 A1* | 7/2015 | Gorman | G06F 17/2705 | 707/752 |
| 2015/0221300 A1* | 8/2015 | Sukhomlinov | G10L 15/26 | 704/246 |
| 2015/0222617 A1* | 8/2015 | Ebersman | H04L 51/12 | 726/4 |
| 2015/0325235 A1* | 11/2015 | Levit | G10L 15/18 | 704/257 |
| 2015/0332670 A1* | 11/2015 | Akbacak | G10L 15/063 | 704/9 |
| 2015/0347433 A1* | 12/2015 | Bhagwan | G06F 17/30737 | 707/749 |
| 2015/0363384 A1* | 12/2015 | Williams | G06F 17/2785 | 704/9 |
| 2015/0370784 A1* | 12/2015 | Nissan | G06F 17/2809 | 704/2 |
| 2016/0104482 A1* | 4/2016 | Aleksic | G10L 15/22 | 704/235 |
| 2016/0133253 A1* | 5/2016 | Braho | G10L 15/22 | 704/251 |
| 2016/0179787 A1* | 6/2016 | Deleeuw | G06F 17/2785 | 704/9 |
| 2016/0210968 A1* | 7/2016 | Ouakil | G06F 17/274 | |
| 2016/0335051 A1* | 11/2016 | Osawa | G10L 15/22 | |
| 2016/0357730 A1* | 12/2016 | Eberbach | G06F 17/2735 | |
| 2016/0378736 A1* | 12/2016 | Byron | G06F 17/30734 | 715/234 |
| 2016/0379629 A1* | 12/2016 | Hofer | G06F 17/277 | 704/257 |
| 2017/0061957 A1* | 3/2017 | Ding | G10L 15/183 | |
| 2017/0132577 A1* | 5/2017 | Merg | G06Q 10/20 | |
| 2017/0133010 A1* | 5/2017 | Printz | G10L 15/19 | |
| 2017/0133015 A1* | 5/2017 | Tomsa | G10L 15/26 | |
| 2017/0161255 A1* | 6/2017 | Starostin | G06F 17/271 | |
| 2017/0200066 A1* | 7/2017 | Wang | G06F 17/30253 | |
| 2017/0213551 A1* | 7/2017 | Ji | B60W 50/10 | |
| 2017/0221477 A1* | 8/2017 | Farraro | G10L 15/063 | |
| 2017/0300472 A1* | 10/2017 | Parikh | G06F 17/276 | |
| 2017/0318024 A1* | 11/2017 | Ebersman | G06F 17/2785 | |
| 2017/0358304 A1* | 12/2017 | Castillo Sanchez | G06F 3/04842 | |
| 2018/0012594 A1* | 1/2018 | Behzadi | G10L 15/02 | |

* cited by examiner

AUTOMATIC LEARNING OF LANGUAGE MODELS

BACKGROUND

Voice recognition systems in smart devices enable users to provide audible commands to the smart devices. Some smart devices translate the audible commands into text by matching audio data to translation data associated with text, and then deliver the text to an application to execute the command based on the text. However, current voice recognition systems are limited by their library of words to which the audible commands can be translated.

This background provides context for the disclosure. Unless otherwise indicated, material described in this section is not prior art to the claims in this disclosure and is not admitted to be prior art by inclusion in this section.

SUMMARY

This document describes techniques for, and systems that enable, context-dependent speech recognition. The techniques described enable accurate recognition of speech by accessing context-dependent sub-libraries associated with the context of the speech to be recognized. These techniques translate audible input into audio data at a smart device and determine context for the speech, such as location-based, temporal-based, recipient-based, and application based context. The smart device then accesses a context-dependent library to compare the audio data with phrase-associated translation data in one or more sub-libraries of the context-dependent library to determine a match. In this way, the techniques allow access to a large quantity of phrases while reducing incorrect matching of the audio data to translation data caused by organizing the phrases into context-dependent sub-libraries.

This document also describes techniques for building a context-dependent library. The techniques described enable a computing device to analyze text-based communications to determine phrases within the communication and context of the communication. The context may include multiple elements of context associated with individual sub-libraries. The phrases are then used to alter the context-dependent library. The altering may include adding the phrase to the context-dependent library or increasing a priority of the phrase within the context-dependent library.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
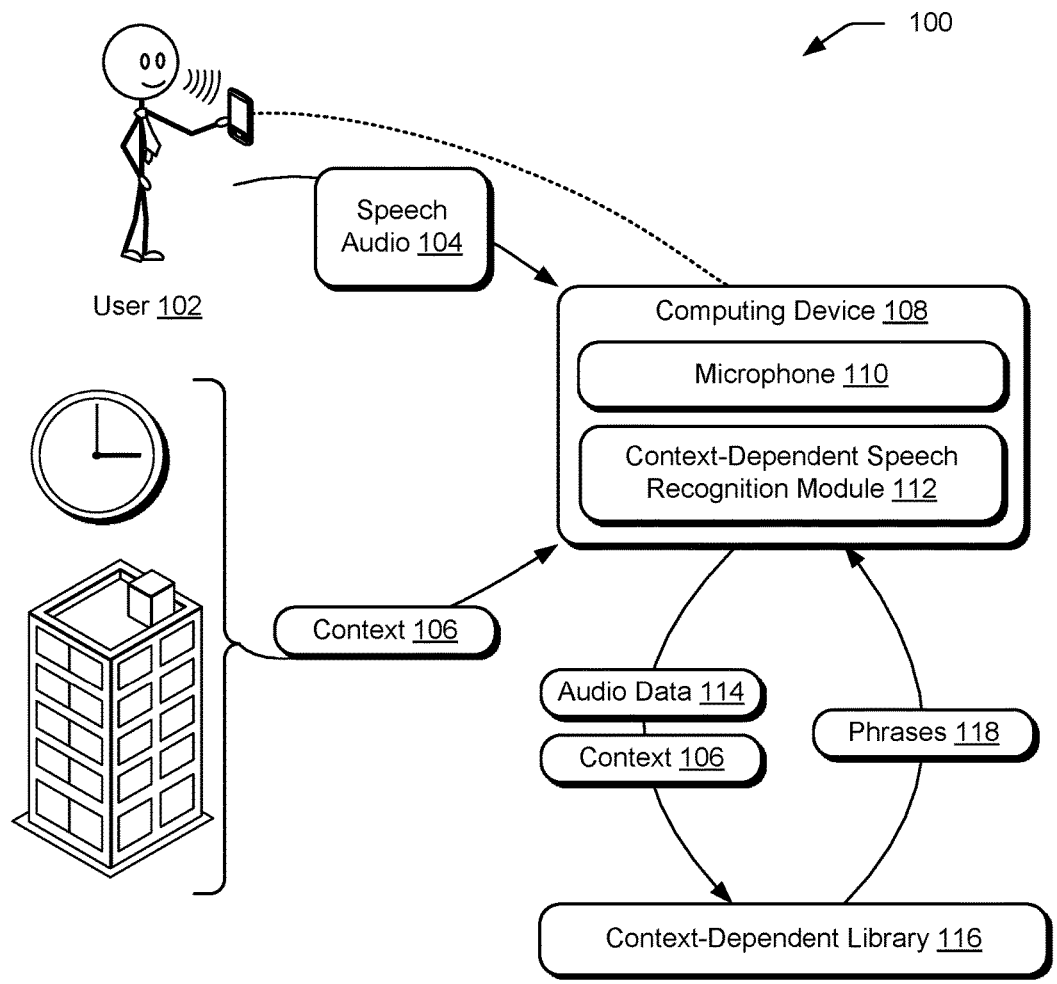
FIG. 1 is an illustration of an example environment for context-dependent speech recognition in accordance with one or more implementations.

Current voice recognition systems merely allow users to choose between having too few words in a library to include phrases spoken by the users, or having too many words in a library to determine which phrase is a correct match for the phrases spoken by the users. A library having too few words leads to frustration by the user as the smart device either cannot process the audible command or incorrectly matches the audio data to translation data associated with text in the library that most closely matches the audio data. Some smart devices allow a user to manually add words to the library for better speech recognition, but are unable to add words automatically or provide a contextually-relevant library of phrases for matching to the audible command. If a user manually adds a large quantity of words, the smart device may match the audio data to translation data associated with multiple texts. Thus, if a library is too large, the smart device is more likely to incorrectly match the audio data to translation data. Therefore, users of current voice recognition systems are left to choose between inaccuracies of having too few words in the library, or inaccuracies of having too many words in the library.

This document describes techniques using, and devices enabling, context-dependent speech recognition and altering of a context-dependent library. Through use of these techniques and devices, a computing device can improve accuracy of its speech recognition capabilities. This is accomplished by increasing a quantity of phrases stored in the context-dependent library and accessing some, but not all, sub-libraries of the context-dependent library based on context of speech.

Consider, for example, a situation where a user wishes to use a smart device equipped with voice-recognition to send an email to a team lead within his company. The email discusses a non-public product in development, "Redstone," and references a team-member, Christian Liensberger. Currently, the smart device is unlikely to have either "Redstone" or "Liensberger" in its library because the library is too small, thus resulting in an incorrect matching to a word within the library or an error message that the smart device could not understand the speech. Alternatively, the smart device may include "Redstone" and "Liensberger" because the user, or a system administrator, has manually added the phrases to the library. However, such manual adding of phrases to the library requires the user or system administrator to expend unnecessary effort to build the library. Additionally, the administrator must decide which phrases to add to the library such that the library includes important phrases but does not add too many words to cause confusion and incorrect matching. Thus, a burden is placed on the user or system administrator to balance having enough phrases to include those the user wishes to input via speech and not having too many phrases such that incorrect matching occurs.

Contrast these current voice recognition systems with the techniques and systems described herein. These techniques are easy to use, implemented with minimal user input, and increase a quantity of phrases in a library for recognizing speech without sacrificing incorrect matching caused by including too many words in the library. Considering the previous example, a context-dependent library will be generated for the user based on previous text-based electronic communications.

Assume that the user has received or generated text-based electronic communications ("text-based communications" or "communications") that include the phrases "Redstone" and "Liensberger." For example, emails between coworkers, documents generated or accessed, and other text-based electronic communications may have been sent between other members of the team or company that include the phrases. The context-dependent library will detect phrases within the emails, documents, and other text-based communications to increase a quantity of phrases within the context-dependent library. Each of the emails, documents, and other text-based electronic communications include context, such as a location from which they were generated, a time at which they were generated, and a recipient for whom they were generated. The context-dependent library uses this context to place the phrases into context-dependent libraries (or "sub-libraries") within the context-dependent library. Additionally, a priority or ranking may be assigned to phrases within a sub-library based on frequency or total quantity of uses in text-based communications.

When the user directs his speech to the smart device, the speech is translated into audio data and context of the speech is determined. For example, the context may include that the user is in his office, it is during a workday, and the recipient of the email is the team lead. The audio data and context is then delivered to the context-dependent library to find matched text for the speech. The context-dependent library searches for matches within the office sub-library, the workday sub-library, and the team lead sub-library, with priority given to phrases that appear in each of the three sub-libraries. The matched text is returned to the smart device as instructions for drafting the email.

This is but one example of how the techniques and devices enable context-dependent speech recognition. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that may be employed to perform various techniques described herein.

Example Environment

FIG. 1 is an illustration of an example environment 100 for context-dependent speech recognition in accordance with one or more implementations. Environment 100 illustrates a user 102 providing speech audio 104 along with context 106 of the speech audio 104 to a computing device 108. By way of example, and not limitation, the computing device 108 may be a personal computer, a tablet, a wearable electronic device or, as illustrated, a mobile phone so long as it can receive the speech audio 104, for example, by including a microphone 110. The context 106 includes elements of context reflecting, for example, context that is location-based, temporal-based, person-based, device-based, application-based, or any combination thereof. The context 106 may be determined by the computing device 108, for example, by a context-dependent speech recognition module 112. Additionally or alternatively, the context 106 may be received by the computing device 108 from another device such as a wearable electronic device.

The computing device 108 utilizes the context-dependent speech recognition module 112 to manage a conversion of the speech audio 104 into a format usable by systems and processes of the computing device 108. The context-dependent speech recognition module 112 delivers audio data 114, converted from the speech audio 104, along with the context 106 to a context-dependent library 116. The context-dependent library 116 may be located within storage media of the computing device 108, a network server, over the cloud (as further discussed as 912 of FIG. 9), or any combination thereof. The context-dependent library 116 utilizes the context 106 to determine one or more sub-libraries to access for comparing the audio data 114 to phrases within the context-dependent library 116. The audio data 114 is then matched with translation data associated with phrases in a sub-library. The phrases 118 with which the audio data 114 are matched are then delivered to the computing device 108 for execution by systems and processes of the computing device 108. The phrases 118 include phrases that are one or more words in length such as a tuple, a triple, or an n-gram that represent a term.

In some implementations, a feedback loop is available for providing feedback on accuracy of the matching. If the feedback indicates an incorrect matching, the context-dependent library 116 may be altered to prevent matching similar audio data to the matched phrases in the future.

Figure 2:
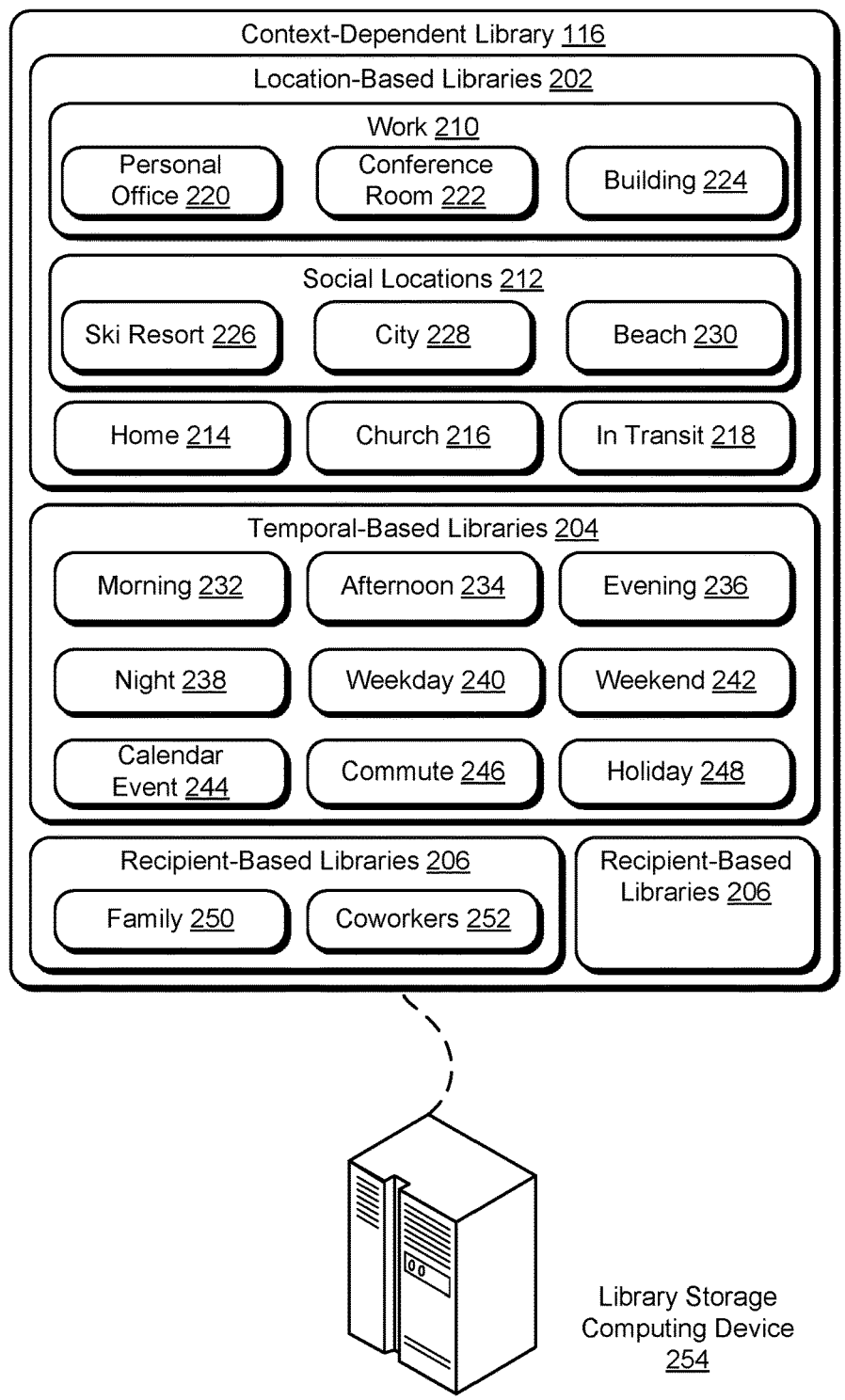
FIG. 2 is an illustration of an example context-dependent library of FIG. 1.

With regard to the context-dependent library 116 of FIG. 1, consider a detailed example illustrated in FIG. 2. In the illustrated implementation, the context-dependent library 116 includes a collection of context-dependent sub-libraries 202-252 and is stored on a library storage computing device 254. As shown, the sub-libraries are grouped by types of context. These groups include location-based libraries 202, temporal-based libraries 204, recipient-based libraries 206, and application-based libraries 208. The groups may be further organized as including sub-groupings such as work 210 and social locations 212. Finally, the sub-libraries include libraries containing phrases and translation data for translating the audio data 114 into phrases 118. Example libraries containing phrases and translation data within the location-based libraries 202 include home 214, church 216, in transit 218, personal office 220, conference room 222, building 224, ski resort 226, city 228, beach 230. In some implementations, the location-based libraries may contain different translation data for a phrase based on an accent associated with one or more of the location-based libraries. These libraries are context-dependent libraries that store phrases sent or generated in a text-based communication from a location corresponding to a respective library.

Example libraries containing phrases and translation data within the temporal-based libraries 204 include morning 232, afternoon 234, evening 236, night 238, weekday 240, weekend 242, calendar event 244, commute 246, and holiday 248. These libraries are context-dependent libraries that store phrases sent or generated in a text-based communication at a time corresponding to a respective library. Similarly, family 250 and coworkers 252 contain phrases and translation data corresponding to respective recipients of a text-based communication.

When the context-dependent speech recognition module 112 delivers the audio data 114 and the context 106 to the context-dependent library 116, all phrases of the context-dependent library 116 that match the audio data may be identified. For example, phrases considered a match for the audio data may be defined as phrases having a similarity with the phrase that exceeds a matching threshold. Priority is given to phrases within libraries corresponding to the elements of the context 106. In some implementations, a highest priority is given to matching phrases that are contained in each library corresponding to each element of the context 106. A next-highest priority may be given to matching phrases contained in some, but not all libraries corresponding to each element of the context 106. Next, priority may be given to matching phrases found in only one of the libraries corresponding to one of the elements of the context 106. Alternatively, or additionally, priority may be given to matching phrases within libraries based on the type of context that the library represents. For example, a matching phrase contained in a recipient based-library that corresponds with the context 106 may be given priority over a matching phrase contained in a temporal-based library that corresponds with the context 106.

In an example implementation of a context-dependent library 116, a company, or other organization, has a shared library that may be accessed by one or more users within the company or organization. The shared library may operate independently or may be one a sub-library such as work 210 in a user's context-dependent library 116. In some of these implementations, the shared library is alterable by analyzing text-based communications of a plurality of the users. The shared library may be organized into sub-libraries for sub-groups, departments, teams, and so forth. Users may be granted access to one or more of these sub-libraries based on their positions within the company or organization. For example, executives may have access to all sub-libraries, supervisors may have access to all team sub-libraries over which they supervise, and team-members may have access to just the sub-library for their team. This would be beneficial when some phrases within the library are confidential between departments and teams.

Figure 3:
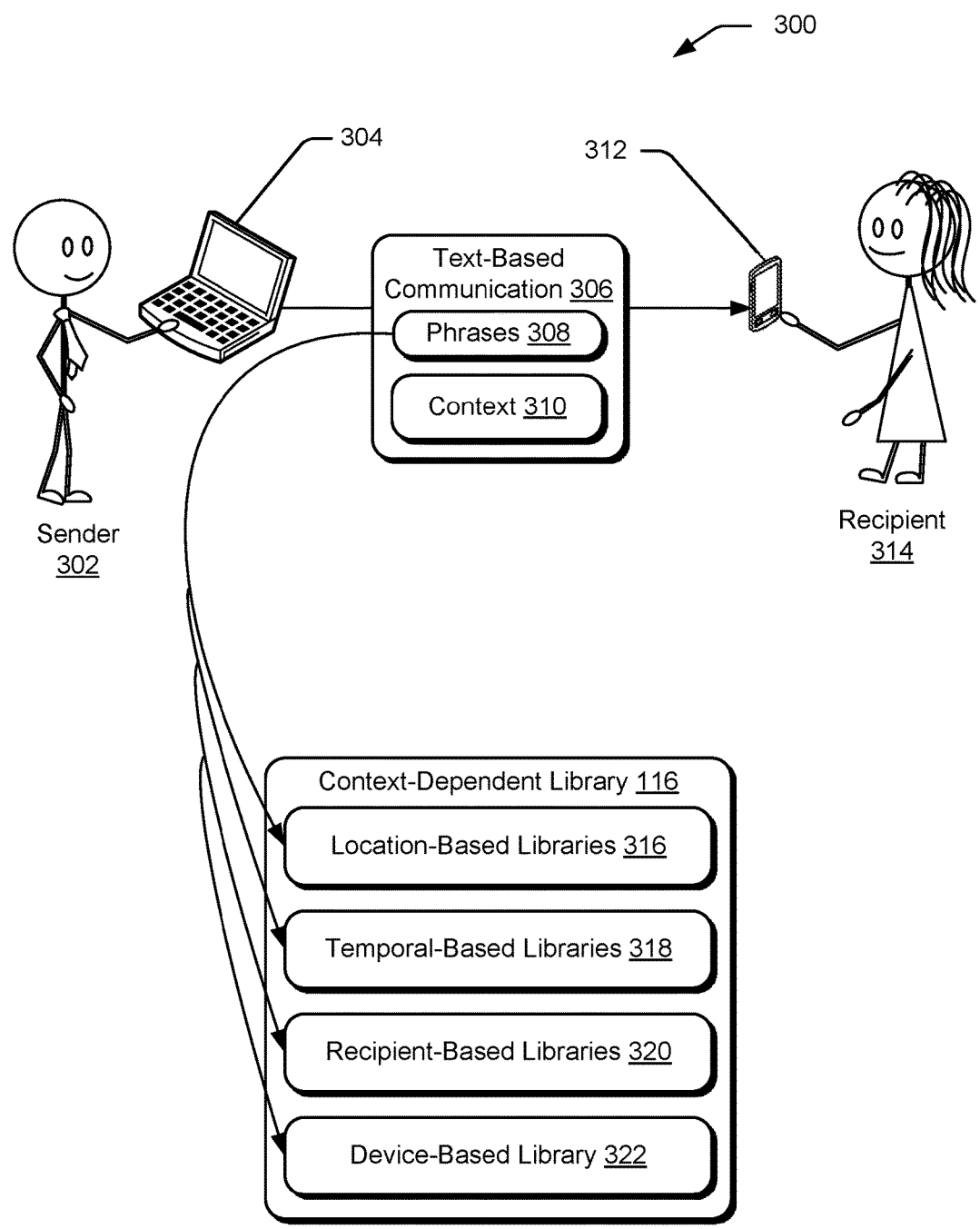
FIG. 3 is an illustration of a system for altering a context-dependent library based on a text-based communication.

FIG. 3 is an illustration of a system for altering the context-dependent library 116, in accordance with one or more implementations. Environment 300 illustrates a sender 302 using a computing device 304 to generate a text-based communication 306. The text-based communication is, for example, an email, a text message, a chat message, a document (e.g., .doc, .docx, .pdf, .txt, .rtf, .pages), a spreadsheet, a presentation, or a calendar event. The text-based communication 306 is analyzed to determine phrases 308 included therein and context 310 of the text-based communication.

As illustrated, the text-based communication 306 is directed to a recipient 314 via another computing device 312. Although the text-based communication 306 is shown as being sent to another user, the recipient 314 may alternatively be an application of the computing device 304, a media storage device of the computing device 304, a network storage device, or resources over the cloud (as discussed in FIG. 9). Additionally or alternatively, the recipient may be a group of users, or even the sender 302. Thus, the text-based communication 306 need not be directed to another user.

Returning again to the example of FIG. 3, the context 310 includes one or more elements of context as described herein. The context 310 is used to determine one or more context-dependent sub-libraries associated with the context 310. For example, the context 310 includes an element of context that is location-based, an element that is temporal-based, an element that is recipient-based, and an element that is device-based. More specifically, the context 310 may include a temporal-based element defining a time at which the text-based communication 306 is sent, received, generated, or accessed. Thus, based on a context vector including one or more elements of context, a context-dependent library of location-based libraries 316, temporal-based libraries 318, recipient-based libraries 320, and/or device-based libraries 322 are determined to be associated with the context 310.

The phrases 308 may then be used to alter the context-dependent libraries associated with the context 310. In some implementations the phrases 308 are first compared with a general library to determine if the phrases 308 are general phrases that do not need to be stored within a sub-library of the context-dependent library 116. Upon determining that the phrases are not within the general library, the phrases are used to alter the associated sub-libraries within the context-dependent library 116 to improve recognition of the phrases 308.

For example, if the phrases "Redstone" and "Liensberger" are identified in the text-based communication 306 the associated sub-libraries will be altered by adding the phrases 308 along with corresponding translation data for matching to audio data 114. In other words, altering the context-dependent libraries includes comparing the phrases 308 with phrases already within the associated sub-libraries. Then, altering the associated sub-libraries to add the determined phrases 308 is responsive to determining that the phrases 308 are not already within the associated sub-libraries.

If the phrases 308 are already in the associated sub-libraries, the phrases 308 may be used to alter the associated sub-libraries by increasing a priority of the phrases 308 within the associated sub-libraries. In this way, altering the associated sub-libraries includes comparing one of the phrases 308 with phrases within the associated sub-library, then altering the associated sub-library to raise a priority of one of the phrases 308 responsive to determining that the phrases 308 are already within the associated sub-library.

In an example implementation of the system for altering the context-dependent library 116, a plurality of users generates text-based communications within a group, such as an enterprise. The text-based communications are analyzed to determine phrases and context for altering associated sub-libraries that are shared between groups of users within the enterprise. Thus, a shared library may be altered by phrases learned by analyzing text-based communications from users such as sent and received emails, sent and receiving messages, calendar events, and documents written and accessed to determined phrases such as project and product names, topics, people, building names, conference room names, and entity names. This results in a shared library that is able to recognize common phrases used by people within the enterprise.

Figure 4:
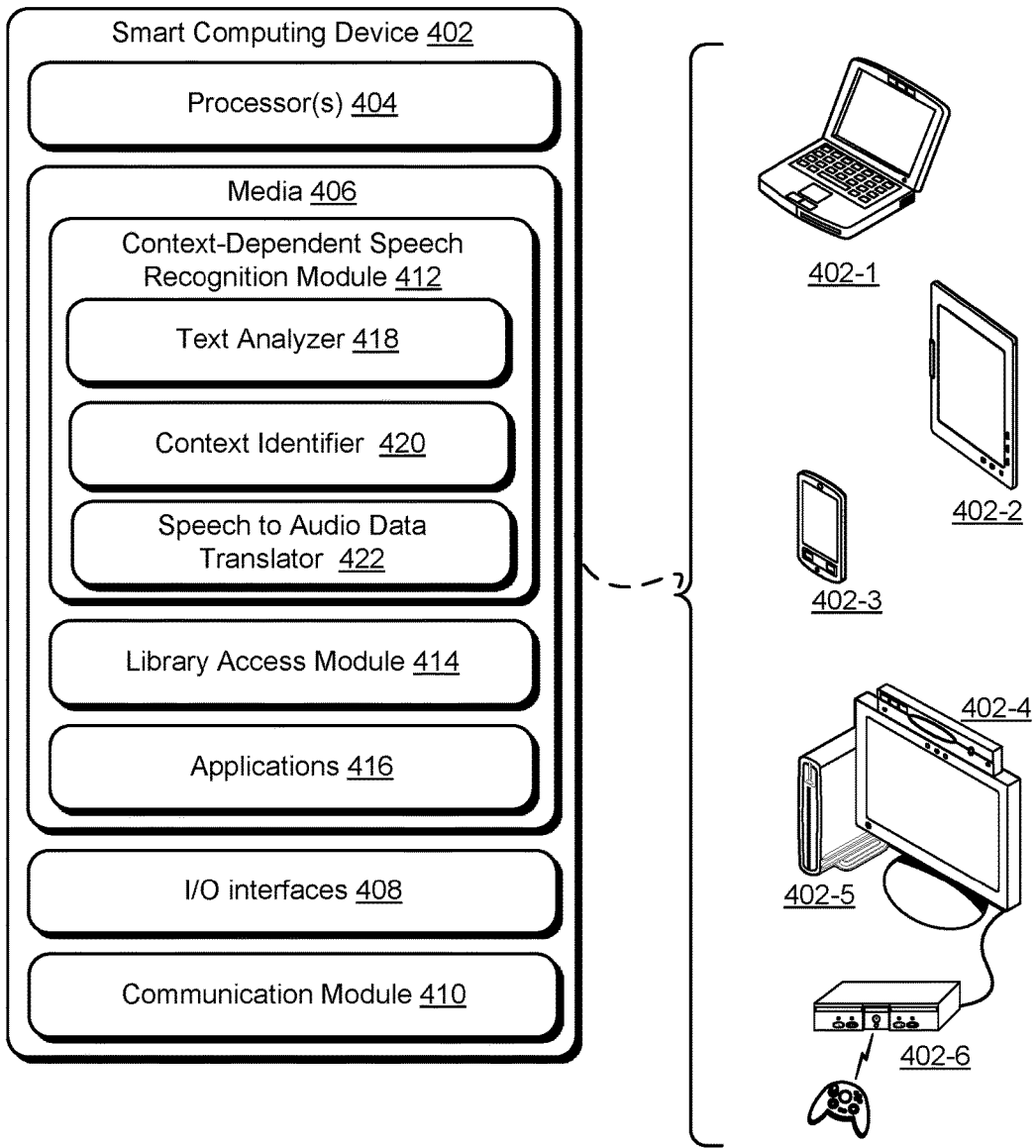
FIG. 4 is an illustration of an example computing device of FIG. 1.

FIG. 4 is an illustration of an example smart computing device 402, which may be implemented, partially or wholly, as the computing device 108 or the computing device 304. The smart computing device 402 includes or has access to processor(s) 404, computer-readable storage media ("media") 412, I/O interfaces 408, and a communication module 410. Examples of the I/O interfaces 408 include the microphone 110 of FIG. 1, a display, a touch sensitive input, a keyboard, and a gaming remote. The communication module 410 includes, for example, hardware and/or software for communicating with another computing device.

The media 406 includes a context-dependent speech recognition module 412, a context-dependent library access module ("library access module") 414, and applications 416. The context-dependent speech recognition module 412 may be implemented as the context-dependent speech recognition module 112. The context-dependent speech recognition module 412 includes a text analyzer 418, a context identifier 420, and a speech to audio data translator 422. The text analyzer 418 is implemented to identify phrases of a text-based communication, such as phrases 308 of text-based communication 306. The identified phrases may be single words, tuples, or triples within the text-based communication. In some implementations, the text analyzer 418 identifies only some of the phrases of the text-based communication, for example, if the phrase is a proper noun, an acronym, a fanciful word, or a word used in irregular context. Additionally or alternatively, the text analyzer 418 identifies phrases that are used in headings, subject lines, address lines, or with high frequency within the text-based communication.

The speech to audio data translator 422 encodes sound waves of detected speech into audio data that is usable to identify the detected speech. In some implementations, the audio data translator 422 is incorporated with, or configured to communication with, the I/O interfaces 408 such as the microphone 110 of FIG. 1. The library access module 424 is used to access a context-dependent library to compare the audio data with translation data corresponding to phrases stored in the context-dependent library. The library access module 424 may access a context-dependent library that is local to the smart computing device 402, or it may access a context-dependent library that is remote via the communication module 410 and a network or the cloud. In some examples, the library access module 424 accesses a context-dependent library, such as the context-dependent libraries 116, 202-252, and 316-322 of FIGS. 1-3 to compare the audio data with phrases, and corresponding translation data, stored therein. Additionally or alternatively, the library access module 424 does not perform the comparing, but rather accesses or directs a comparator local to the context-dependent library to compare the audio data with phrases and corresponding translation data stored in the context-dependent library.

The representing phrases are delivered to the smart computing device 402 for execution via one or more applications 416. The representing phrases may be used to deliver instructions to applications 416. For example, the representing phrases may be used to initiate applications 416 or provide content for use by applications 416.

Example Methods

Figure 5:
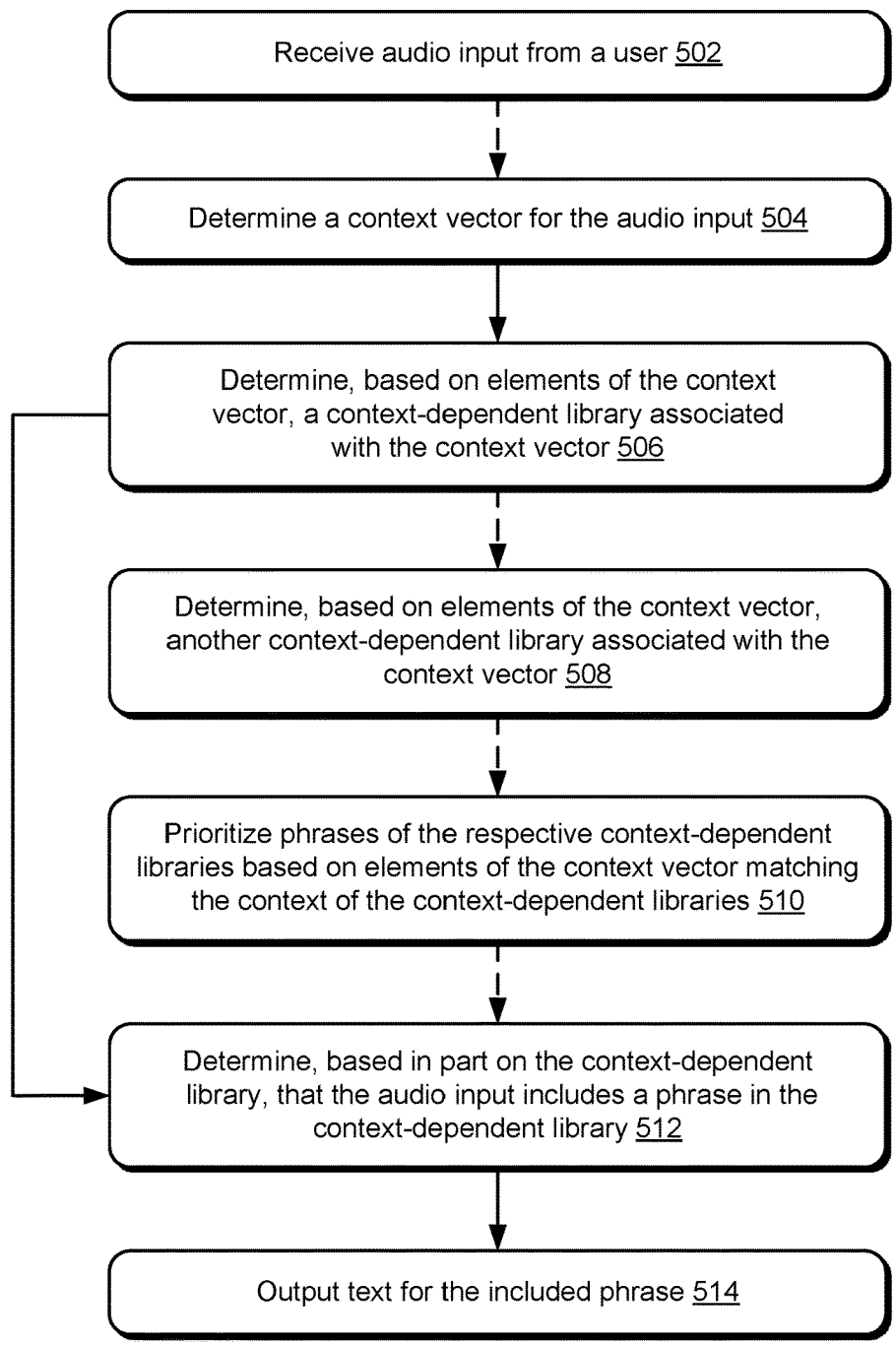
FIG. 5 illustrates a method for context-dependent speech recognition.

FIG. 5 depicts a method enabling or using a context-dependent library for speech recognition. This method is shown as a set of blocks that specify operations performed but are not necessarily limited to the order or combinations shown for performing the operations by the respective blocks. In portions of the following discussion reference may be made to environment 100 of FIG. 1 and entities detailed in FIGS. 2-4, reference to which is made for example only. The techniques are not limited to performance by one entity or multiple entities operating on one device.

Figure 6:
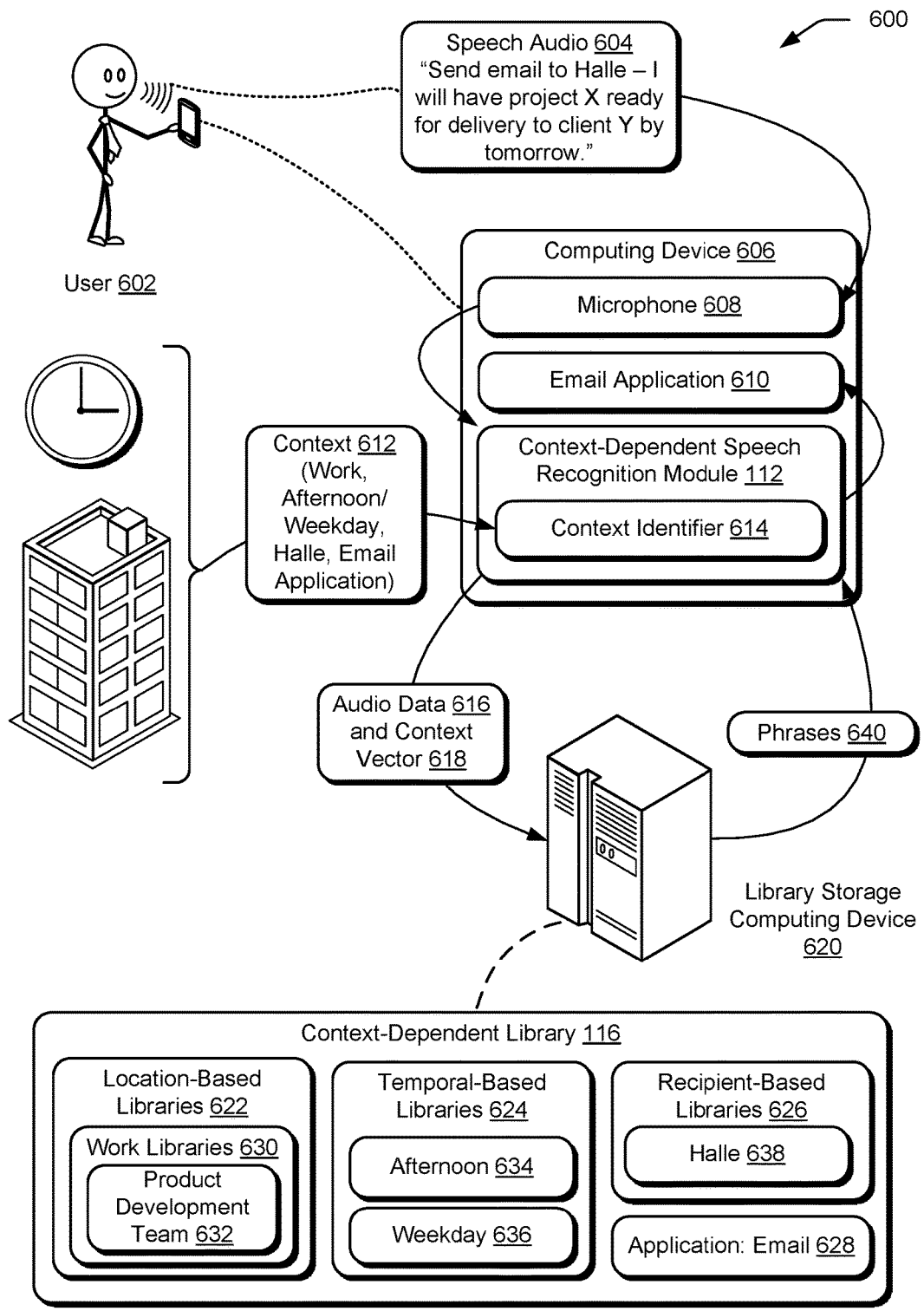
FIG. 6 illustrates an example of context-dependent speech recognition.

Optionally, at 502, audio input is received from a user, for example, by microphone 110 or I/O interfaces 408. As noted this input may be directly received from the user, or may be relayed from another device, such as a wired or wireless microphone, or another computing device. The audio input includes speech from the user that includes one or more audible phrases. The user may provide the audio input to direct a smart device to execute an application of the smart device, or another device connected to the smart device. For example, as depicted in FIG. 6, a user 602 provides speech audio 604 that is received by a computing device 606 via a microphone 608 to execute an email application 610 to send an email.

Returning to FIG. 5, at 504, a context vector is determined for the audio input. As discussed herein, the context vector includes one or more elements of context for the audio input. The elements of context may include one or more of those discussed herein such as a name of a recipient of the audio input, a current location, an application to be executed, a device used to receive the audio input, a time of day, a day of the week, a holiday, a calendar event during or near a time of receiving the audio input, or a position within a company of the user. For example, as depicted by context 612 of FIG. 6, context of the speech audio 604 includes elements of context that are location-based (work), temporal-based (afternoon/weekday), recipient-based (Halle), and application-based (email application). The context 612 may be delivered to and/or determined by a context identifier 614 of a context-dependent speech recognition module 112 of the computing device 606.

Returning again to FIG. 5, at 506, a context-dependent library associated with the context vector is determined based on the context vector. The context-dependent library may be a sub-library of another context-dependent library that includes phrases that have been associated with one or more elements of the context vector. For example, as depicted in FIG. 6, a context-dependent library 116 includes multiple layers of sub-libraries, each of which being a context-dependent library associated with various elements of context. As shown, location-based libraries 622, temporal-based libraries 624 and recipient-based libraries 626 each include additional sub-libraries. An application: email 628 library is shown as a first level sub-library containing phrases and translation data for recognizing phrases in the speech audio 604. Work libraries 630 is shown as a location within location-based libraries 622. As discussed above, a company may organize the work libraries for departments, teams, and so forth. As shown, a product development team 632 library is a sub-library of the work libraries 630 to which the user 602 has access. The temporal-based libraries 624 include afternoon 634 and weekday 636 sub-libraries that are both associated with the context vector 618 based on the temporal-based elements of context. Halle 638 is a sub-library of the recipient-based libraries 626 that is associated with the context vector 618 based on the recipient-based element of context. The context-dependent speech recognition module 412 may determine context-dependent libraries associated with the context vector by querying the library storage computing device 620 using the context vector 618.

In some implementations, the context-dependent library 116 may combine phrases that are included in each of the product development team 632, the afternoon 634, the weekday 636, the Halle 638, and the application: email 628 sub-libraries into a first context vector library.

Optionally, at 508, another context-dependent library associated with the context vector is determined based on elements of the context vector. For example, the other, or second, context-dependent library may be a context vector library of phrases that are included in all but one sub-library that is associated with the context vector. Further context vector libraries may be generated based on phrases that are included in all but one other sub-library and based on phrases that are included in all but two sub-libraries, etc. The determining at 508 may be performed by the context-dependent speech recognition module 112 by querying the library storage computing device 620. Optionally, at 510, phrases of the respective context-dependent libraries are prioritized based on elements of the context vector matching the context of the context-dependent libraries. For example, the context vector libraries may be prioritized based on a quantity and the type of context-dependent libraries from which they are derived. This prioritizing may also be performed by the context-dependent speech recognition module 112 querying the library storage computing device 620.

At 512, a phrase in the context-dependent library is determined, based in part on the context-dependent library, to be included in the audio input. For example, the context-dependent speech recognition module 112 compares, or causes the library storage computing device 620 to compare, the audio data 616 with phrases and translation data of one or more of the context-dependent libraries such as the context vector libraries described above.

Phrases are found in the context-dependent library to represent the audio data based on the comparisons of the audio data with phrases and corresponding translation data. In some implementations where multiple phrases are determined to be candidates for representing the audio data based on similarity to the audio data, a highest priority phrase that is above a threshold similarity is determined to be the representing phrase. Additionally or alternatively, a representing phrase may be determined based on the phrase being included in multiple context-dependent sub-libraries associated with a context vector. Further, a representing phrase may be determined based on having a similarity above a similarity threshold (such as 80% similarity). For example, a highest priority phrase that is above a similarity threshold and is included in all of the context-dependent sub-libraries associated with a context vector may be determined as the representing phrase.

In some implementations, the sub-libraries of the context-dependent library that are associated with the context vector may be prioritized by importance of a type of context resulting in the association. For example, if no phrases above the similarity threshold are included in all of the context-dependent sub-libraries associated with the context vector, phrases included in some of the sub-libraries associated with the context vector are analyzed. In such examples, priority may be given to phrases in sub-libraries based on a type of context of the sub-library, such as location-based or temporal based, that result in the associating with the context vector. Types of context may be prioritized as recipient-based, location-based, temporal-based, then application-based. Further, a phrase included in two lower-priority sub-libraries may be given priority over a phrase included in only the highest-priority sub-library.

At 514 text for the included phrase is output. For example, context-dependent speech recognition module 112 outputs phrases 640, in text format, to the email application 610 that is configured to execute a command based on the phrases 640.

Although not explicitly discussed above, each element of the method of FIG. 5 may be performed by the library storage computing device 620. For example, the library storage computing device 620 receives audio input (speech audio 604 or audio data 616) from a user via the computing device 606. The library storage computing device 620 determines a context vector for the audio input that is based on information provided by the computing device 606 and/or information derived from the receiving of the audio input, such as temporal-based context element. Next, the library storage computing device 620 determines, based on elements of the context vector, one or more libraries associated with the context vector from the context-dependent libraries that are stored on computer-readable media that is local to, or accessible to, the library storage computing device 620. The library storage computing device 620 may also generate context vector libraries based on phrases included in multiple sub-libraries associated with the context vector, as discussed above. The context vector libraries, and phrases included therein, may be prioritized by the library storage computing device 620 based on elements of the context vector 618 matching the context of the context vector libraries. The library storage computing device 620 then determines, based in part on the context-dependent library, that the audio input includes a phrase in the context-dependent library by comparing phrases and translation data from the sub-libraries and/or context vector libraries with the audio input. The library storage computing device 620 then outputs the text for the included phrase to the computing device 606.

Figure 7:
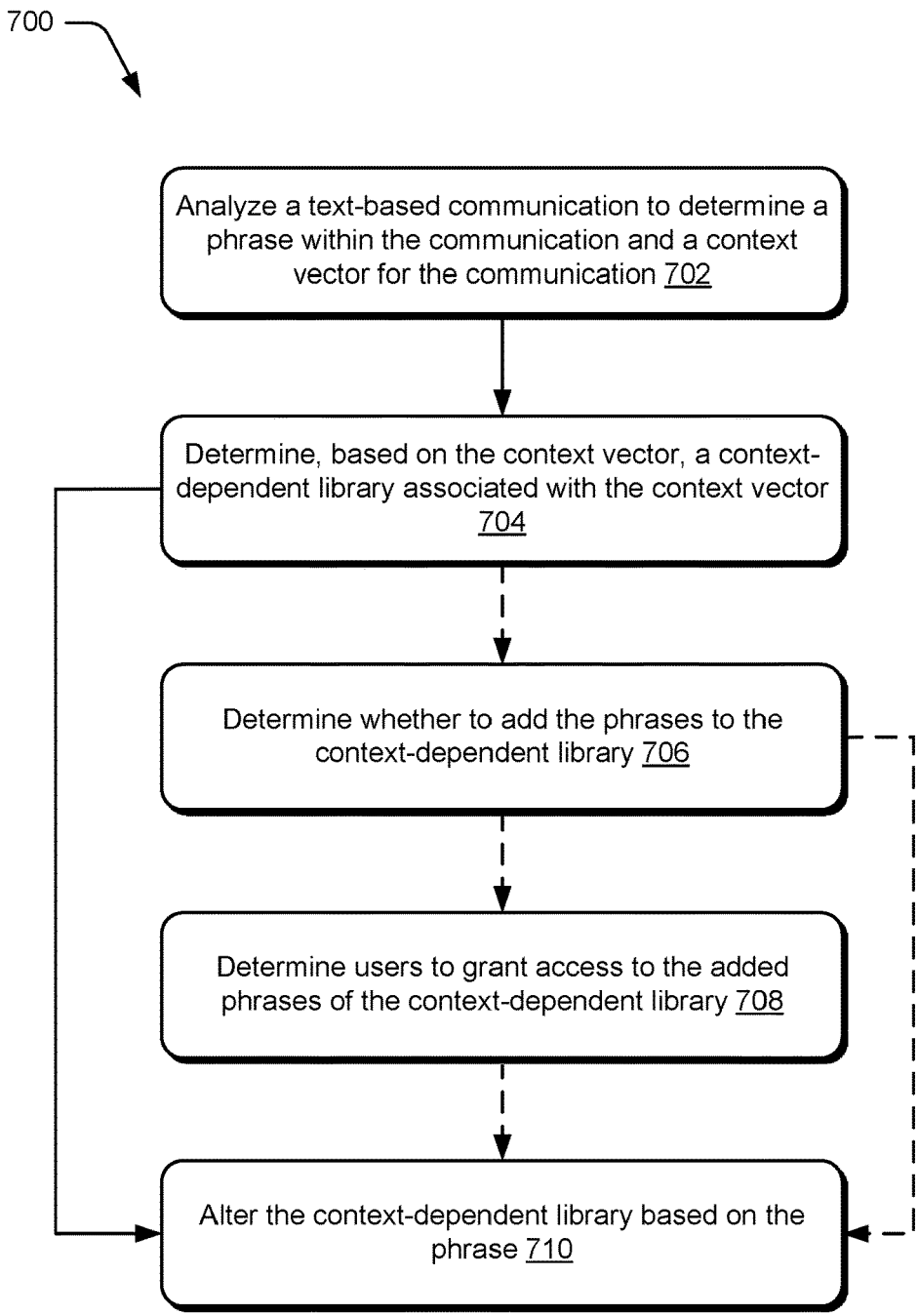
FIG. 7 illustrates a method of altering a context-dependent library based on a text-based communication.

FIG. 7 depicts a method for altering a context-dependent library based on phrases determined from a text-based communication. This method is shown as a set of blocks that specify operations performed but are not necessarily limited to the order or combinations shown for performing the operations by the respective blocks. In portions of the following discussion reference may be made to environment 100 of FIG. 1 and entities detailed in FIGS. 2-4, reference to which is made for example only. The techniques are not limited to performance by one entity or multiple entities operating on one device.

At operation 702, a text-based communication is analyzed to determine one or more phrases within the communication and a context vector for the text-based communication. For example, the text analyzer 418 and the context identifier 420 of the smart computing device 402 determine phrases 308 and context 310 for the text-based communication 306. Further depicted in an example implementation of FIG. 8, a user 802 of a computing device 804 generates a text-based communication 806. The text-based communication 806 is analyzed to determine phrases 808 and context 810 for the text-based communication 806.

Figure 8:
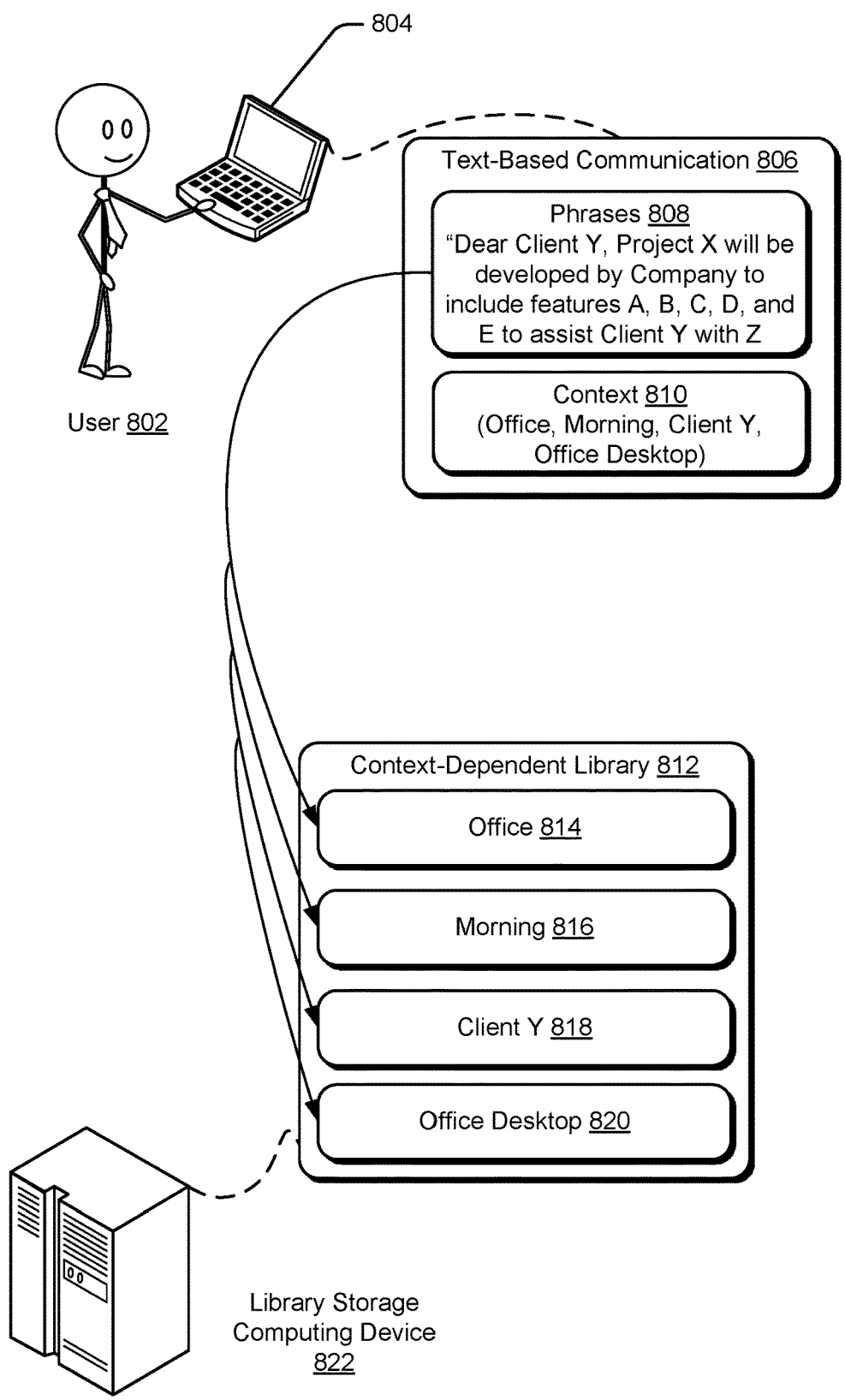
FIG. 8 illustrates an example of altering a context-dependent library based on a text-based communication.

A context-dependent library associated with the context vector is determined based on the context vector at operation 704. As depicted in FIG. 8, a context-dependent library 812 is accessed to determine that an office 814 library, a morning 816 library, a client Y 818 library, and an office desktop 820 library, each being a context-dependent library, is associated with the context 810 vector based on the depicted elements of context 810. The determining may be performed by the computing device 804 or another computing device, such as the library storage computing device 822.

Optionally, at 706, whether to add the phrases to the context-dependent library 706 is determined. For example, if the phrases are not already in the associated context-dependent library with which the context vector is associated, the phrases may be conditionally added to the context-dependent library. However, the user or a system administrator may desire an opportunity to approve or reject an addition of a new phrase. Therefore, before adding the new phrase, an approval request may be sent to the user or a system administrator to determine whether the new phrases are to be added to the context-dependent library. The approval request may be sent by a library storage computing device 822 or by the computing device 804. This may be helpful to prevent adding a misspelled phrase, a secret phrase, or an unwanted name of a person or project.

Optionally, at 708, the users for whom access is granted to the added phrases is determined. For example, a user or system administrator may approve an addition of a new phrase, but wish to allow the new phrase to be accessible to only a portion of users having access to the context-dependent library. Thus, either included with the approval request or as a separate request, the user or a system administrator may be solicited for a designation of users to be granted access to the new phrase. The system administrator may designate users to be granted access to the new phrase based on a user's position within a company, office location, or project affiliation. The solicitation may be sent by a library storage computing device 822 or by the computing device 804.

The context-dependent library is altered at operation 710 based on one or more of the determined phrases. Altering may include, for example, adding the determined phrases to the context-dependent library responsive to determining that the phrases are not already within the context-dependent library. Once the determined phrases are added to the context-dependent library, the phrases are leveraged to understand phrases spoken by a user. As discussed above, the phrases may be accessed by a single user or a group of users, such as a department at a company. In some implementations, the phrases will be available for speech recognition for users that have used the phrases in a text-based communication, have access to text based-communications including the phrases, have been granted access by another user, or are otherwise exposed to the phrases though means within a company's structure. This may be effective to prevent unauthorized users at a company from discovering secret phrases stored in the context-dependent-library. To accomplish this, the context-dependent library may be organized into sub-libraries containing different phrases to which different groups of users are granted access.

Additionally or alternatively, altering may include raising a priority of the phrases within the context-dependent library responsive to determining that the phrases are already within the context-dependent library.

The preceding discussion describes methods relating to automatic learning of language models for use in speech recognition systems. Aspects of these methods may be implemented in hardware (e.g., fixed logic circuitry), firmware, software, manual processing, or any combination thereof. These techniques may be embodied on one or more of the entities shown in FIGS. 1-4, 6, 8 and 9 (computing system 900 is described in FIG. 9 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example System and Device

Figure 9:
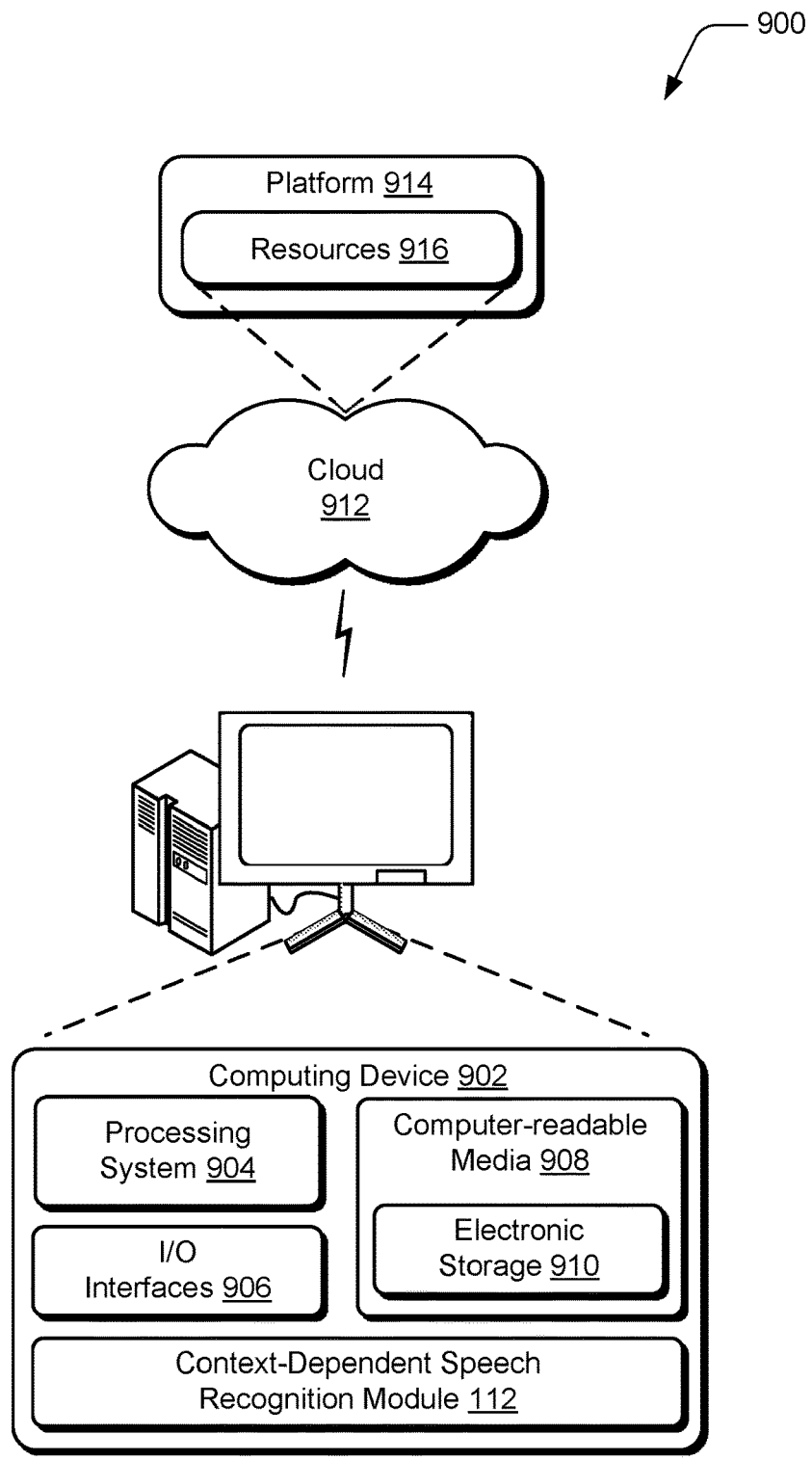
FIG. 9 illustrates an example system that can be implemented as any type computing device as described and/or utilized with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the context-dependent speech recognition module 112. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 908, and one or more I/O interfaces 906 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 may be implemented, at least in part, in hardware elements that may be configured as processors, functional blocks, and so forth. This may include implementation in hardware as an application specific integrated circuit or other logic device formed using one or more semiconductors. The hardware elements are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 908 is illustrated as including electronic storage 910. Electronic storage represents memory/storage capacity associated with one or more computer-readable media. Electronic storage 910 may include volatile media (such as random access memory (RAM)) and/or nonvolatile media (such as read only memory (ROM), Flash memory, optical disks, magnetic disks, and so forth). Electronic storage 910 may include fixed media (e.g., RAM, ROM, a fixed hard drive, and so on) as well as removable media (e.g., Flash memory, a removable hard drive, an optical disc, and so forth). Computer-readable media 908 may be configured in a variety of other ways as further described below.

Input/output interface(s) 906 are representative of functionality to allow a user to enter commands and information to computing device 902, and also allow information to be presented to the user and/or other components or devices using various input/output devices. Examples of input devices include a keyboard, a cursor control device (e.g., a mouse), touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), a network card, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media 908 may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, computer-readable media 908 and other hardware elements are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 912 via a platform 914 as described below.

The cloud 912 includes and/or is representative of the platform 914 for resources 916. The platform 914 abstracts underlying functionality of hardware (e.g., servers) and software resources 916 of the cloud 912. Resources 916 may include applications and/or data that can be utilized while computer processing is executed on servers that are remote from the computing device 902. Resources 916 can also include services provided over the Internet and/or through a subscriber network, such as a cellular or Wi-Fi network.

The platform 914 may abstract resources and functions to connect the computing device 902 with other computing devices. The platform 914 may also serve to abstract scaling of resources to provide a corresponding level of scale to encountered demand for resources 916 that are implemented via the platform 914. Accordingly, in an interconnected device implementation, implementation of functionality described herein may be distributed throughout the system 900. For example, the functionality may be implemented in part on the computing device 902 as well as via the platform 914 that abstracts the functionality of the cloud 912.

Example Implementations

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

Example 1. A method for building a context-dependent library comprising: analyzing a text-based communication to: determine a phrase within the text-based communication, the phrase being one or more words in length; determine a context vector for the text-based communication; determining, based on the context vector for the text-based communication, a context-dependent library associated with the context vector; and altering the context-dependent library based on the phrase, the context-dependent library usable for speech recognition of speech audio having another context vector associated with the context-dependent library.

Example 2. The method of example 1, wherein altering the context-dependent library includes comparing the phrase with phrases in a general library, and altering the context-dependent library is responsive to determining that the phrases are not within the general library.

Example 3. The method of example 1, wherein altering the context-dependent library includes comparing the phrase with phrases in the context-dependent library and altering the context-dependent library is responsive to determining that the phrase is already within the context-dependent library, the altering effective to raise a priority of the phrase within the context-dependent library.

Example 4. The method of example 1, wherein altering the context-dependent library includes comparing the phrase with phrases in the context-dependent library and altering the context-dependent library is responsive to determining that the phrase is not already within the context-dependent library, the altering effective to add the phrase to the context-dependent library.

Example 5. The method of example 1, wherein the phrase on which the altering is based is an n-gram.

Example 6. The method of example 1, wherein the context vector includes one or more of a time at which the text-based communication is sent and a time at which the text-based communication is received.

Example 7. The method of example 1, wherein the context vector includes a one or more of name of a sender of the text-based communication and a name of a recipient of the text-based communication.

Example 8. The method of example 1, wherein the context-dependent library is shared and accessed by one or more users of an organization.

Example 9. The method of example 8, wherein the shared context-dependent library is alterable by a plurality of the one or more users of the organization.

Example 10. The method of example 1, further comprising: organizing the context-dependent library into sub-libraries; and granting access to one or more sub-libraries of the context-dependent library to users within a company based on the respective user's position in the company.

Example 11. A method for speech recognition comprising: determining a context vector for speech audio spoken by a user, the context vector including one or more elements of context; determining, based on the context vector, a context-dependent library associated with the context vector; determining, based in part on the context-dependent library, that the speech audio includes a phrase in the context-dependent library; and outputting text for the included phrase.

Example 12. The method of example 11, wherein the outputting text includes delivering the included phrase to an application that is configured to execute a command based on the included phrase.

Example 13. The method of example 11, wherein the context-dependent library includes sub-libraries based on elements of context.

Example 14. The method of example 11, wherein the one or more elements of context include one or more of a location-based element, a temporal-based element, a recipient-based element, or a device-based element.

Example 15. The method of example 11, wherein determining that the speech audio includes the included phrase in the context-dependent library comprises comparing audio data of the speech audio with translation data of phrases in the context-dependent library.

Example 16. The method of example 15, further comprising: determining that multiple phrases in the context-dependent library are determined to be candidates for representing the audio data based on similarity to the audio data, the determined phrase being a highest priority phrase in the context-dependent library that is above a threshold similarity.

Example 17. The method of example 15, wherein the context-dependent library is a context vector library comprising phrases that are included in one or more sub-libraries associated with the one or more elements of context.

Example 18. A system for altering a context-dependent library of phrases, the system comprising: at least one processor; at least one computer-readable storage medium storing instructions that are executable by the at least one processor to perform operations including: analyzing a text-based communication of a user within an organization to: determine a phrase within the text-based communication, the phrase being one or more words in length; and determine a context vector for the text-based communication; determining, based on the context vector for the text-based communication, a context-dependent library associated with the context vector, the context-dependent library shared with one or more users within the organization; and altering the context-dependent library based the determined phrase, the context-dependent library usable by the one or more users within the organization to improve speech recognition of speech audio having another context vector associated with the context-dependent library.

Example 19. The system of example 18, wherein the operations further include designating the one or more users to be granted access to the phrase based on positions of the one or more users within the organization.

Example 20. The system of example 18, wherein the operations further include: comparing the determined phrase with phrases in the context-dependent library; determining that the phrase is not already within the context-dependent library; and sending an approval request to another user of the one or more users to determine whether the determined phrase is to be added to the context-dependent library.

CONCLUSION

Although the implementations have been described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method for building a context-dependent library comprising:
analyzing a text-based electronic communication to:
determine a phrase within the text-based electronic communication the phrase being one or more words in length,
determine a context for the text-based electronic communication, wherein the context comprises a plurality of analytical elements that comprise one or more user identification elements associated with an organization and one or more of: a location-based element associated with the text-based electronic communication and a temporal-based element associated with the text-based electronic communication, and
determine a context vector for the text-based electronic communication based on analysis of the plurality of analytical elements associated with the determined context;
determining, based on the context vector for the text-based electronic communication, a context-dependent library for speech recognition, wherein the context-dependent library is a sub-library of multi-level library for speech recognition;
altering the context-dependent library by one or more of: adding the phrase into the context-dependent library, and increasing priority of the phrase in the context-dependent library; and
granting access to the context-dependent library to a user within the organization based on a privilege permission of the user within the organization.

2. The method of claim 1, wherein altering the context-dependent library includes comparing the phrase with phrases in a general library and altering the context-dependent library is responsive to determining that the phrase is not within the general library.

3. The method of claim 1, wherein altering the context-dependent library includes comparing the phrase with phrases in the context-dependent library and altering the context-dependent library is responsive to determining that the phrase is already within the context-dependent library, and wherein the altering is effective to raise a priority of the phrase within the context-dependent library.

4. The method of claim 1, wherein altering the context-dependent library includes comparing the phrase with phrases in the context-dependent library and altering the context-dependent library is responsive to determining that the phrase is not already within the context-dependent library, and wherein the altering is effective to add the phrase to the context-dependent library.

5. The method of claim 1, wherein the phrase on which the altering is based is an n-gram.

6. The method of claim 1, wherein the context vector includes one or more of a time at which the text-based electronic communication is sent and a time at which the text-based electronic communication is received.

7. The method of claim 1, wherein the context vector includes a one or more of name of a sender of the text-based electronic communication and a name of a recipient of the text-based electronic communication.

8. The method of claim 1, wherein the context-dependent library is shared and accessed by one or more users of the organization.

9. The method of claim 8, wherein the shared context-dependent library is alterable by the one or more users of the organization.

10. The method of claim 1, further comprising:
organizing the context-dependent library into sub-libraries; and
granting access to one or more sub-libraries of the context-dependent library to users within the organization based on privilege permissions of respective user's within the organization.

11. A system comprising:
at least one processor; and
a memory, operatively connected with the at least one processor, storing computer-executable instructions that, when executed by the at least one processor, causing the at least one processor to execute a method that comprises:
analyzing a text-based electronic communication to:
determine a phrase within the text-based electronic communication the phrase being one or more words in length,
determine a context for the text-based electronic communication, wherein the context comprises a plurality of analytical elements that comprise one or more user identification elements associated with an organization and one or more of: a location-based element associated with the text-based electronic communication and a temporal-based element associated with the text-based electronic communication, and
determine a context vector for the text-based electronic communication based on analysis of the plurality of analytical elements associated with the determined context;
determining, based on the context vector for the text-based electronic communication, a context-dependent library for speech recognition, wherein the context-dependent library is a sub-library of multi-level library for speech recognition;
altering the context-dependent library by one or more of:
adding the phrase into the context-dependent library, and increasing priority of the phrase in the context-dependent library; and
granting access to the context-dependent library to a user within the organization based on a privilege permission of the user within the organization.

12. The system of claim 11, wherein altering the context-dependent library includes comparing the phrase with phrases in a general library and altering the context-dependent library is responsive to determining that the phrase is not within the general library.

13. The system of claim 11, wherein altering the context-dependent library includes comparing the phrase with phrases in the context-dependent library and altering the context-dependent library is responsive to determining that the phrase is already within the context-dependent library, and wherein the altering is effective to raise a priority of the phrase within the context-dependent library.

14. The system of claim 11, wherein the context-dependent library is shared and accessed by one or more users of the organization, and the shared context-dependent library is alterable by the one or more users of the organization.

15. The system of claim 11, wherein the method, executed by the at least one processor, further comprises: organizing the context-dependent library into sub-libraries; and granting access to one or more sub-libraries of the context-dependent library to users within the organization based on privilege permissions of respective users within the organization.

16. A computer-readable storage media storing computer-executable instructions that, when executed by at least one processor, causing the at least one processor to execute a method comprising:
analyzing a text-based electronic communication to:
determine a phrase within the text-based electronic communication the phrase being one or more words in length,
determine a context for the text-based electronic communication, wherein the context comprises a plurality of analytical elements that comprise one or more user identification elements associated with an organization and one or more of: a location-based element associated with the text-based electronic communication and a temporal-based element associated with the text-based electronic communication, and
determine a context vector for the text-based electronic communication based on analysis of the plurality of analytical elements associated with the determined context;
determining, based on the context vector for the text-based electronic communication, a context-dependent library for speech recognition, wherein the context-dependent library is a sub-library of multi-level library for speech recognition;
altering the context-dependent library by one or more of:
adding the phrase into the context-dependent library, and increasing priority of the phrase in the context-dependent library; and
granting access to the context-dependent library to a user within the organization based on a privilege permission of the user within the organization.

17. The computer-readable storage media of claim 16, wherein altering the context-dependent library includes comparing the phrase with phrases in a general library and altering the context-dependent library is responsive to determining that the phrase is not within the general library.

18. The computer-readable storage media of claim 16, wherein altering the context-dependent library includes comparing the phrase with phrases in the context-dependent library and altering the context-dependent library is responsive to determining that the phrase is already within the context-dependent library, and wherein the altering is effective to raise a priority of the phrase within the context-dependent library.

19. The computer-readable storage media of claim 16, wherein the context-dependent library is shared and accessed by one or more users of the organization, and the shared context-dependent library is alterable by the one or more users of the organization.

20. The computer-readable storage media of claim 16, wherein the method, executed by the at least one processor, further comprises: organizing the context-dependent library into sub-libraries; and granting access to one or more sub-libraries of the context-dependent library to users within the organization based on privilege permissions of respective users within the organization.

* * * * *